Feb. 7, 1961          J. H. AUGUST          2,971,045

GAS VENT CLOSURE FOR ELECTRIC STORAGE BATTERIES

Filed July 7, 1958          4 Sheets-Sheet 1

INVENTOR.
JOHN H. AUGUST

BY

ATTORNEYS.

Feb. 7, 1961  J. H. AUGUST  2,971,045
GAS VENT CLOSURE FOR ELECTRIC STORAGE BATTERIES
Filed July 7, 1958  4 Sheets-Sheet 2
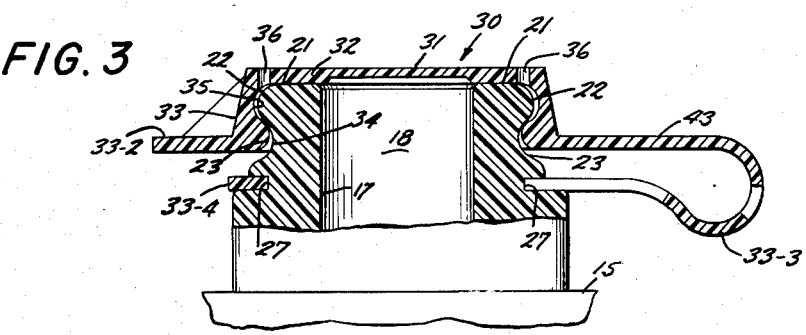
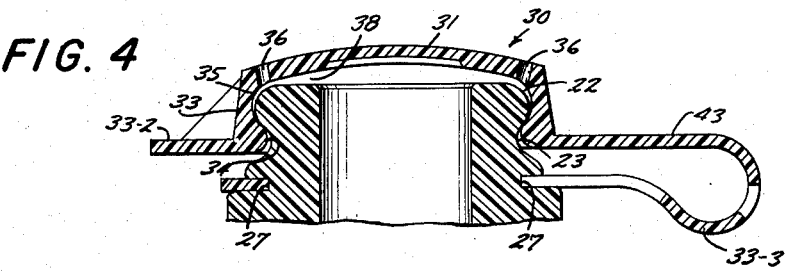
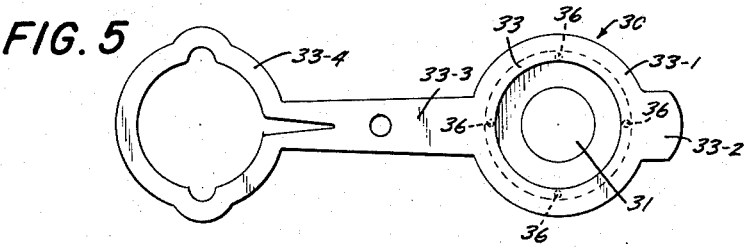
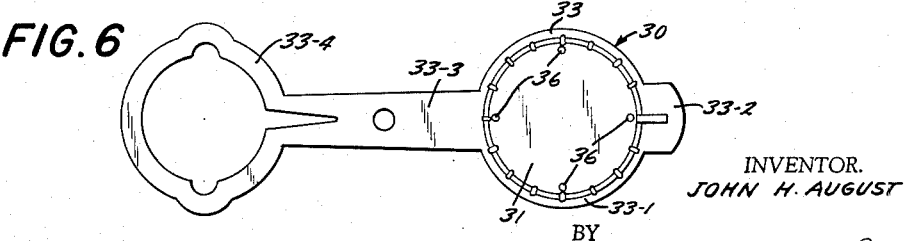
INVENTOR.
JOHN H. AUGUST
BY
Greene, Pineles & Durr
ATTORNEYS Feb. 7, 1961    J. H. AUGUST    2,971,045
GAS VENT CLOSURE FOR ELECTRIC STORAGE BATTERIES
Filed July 7, 1958    4 Sheets-Sheet 3
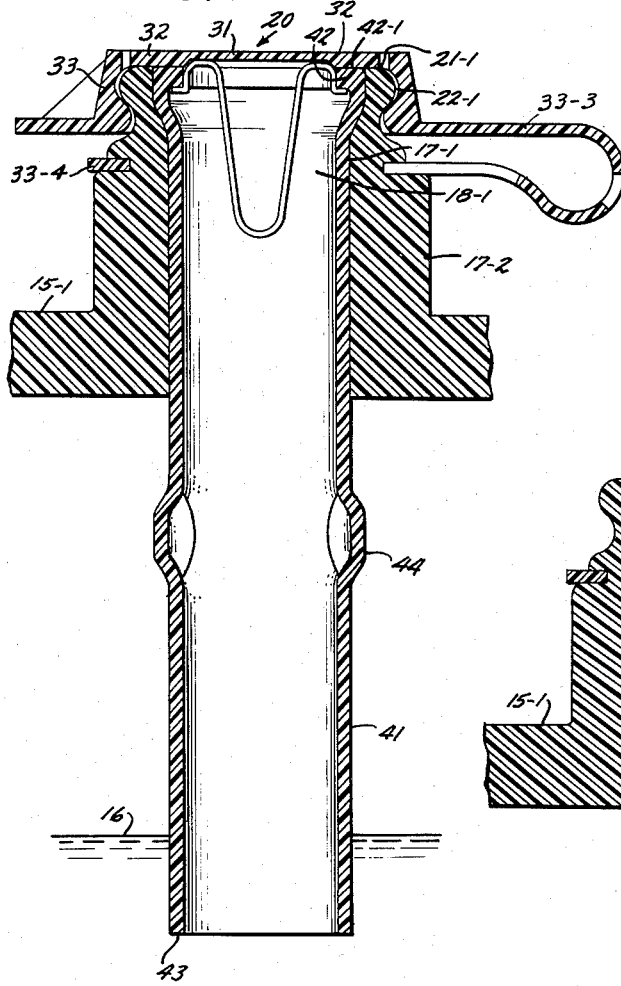
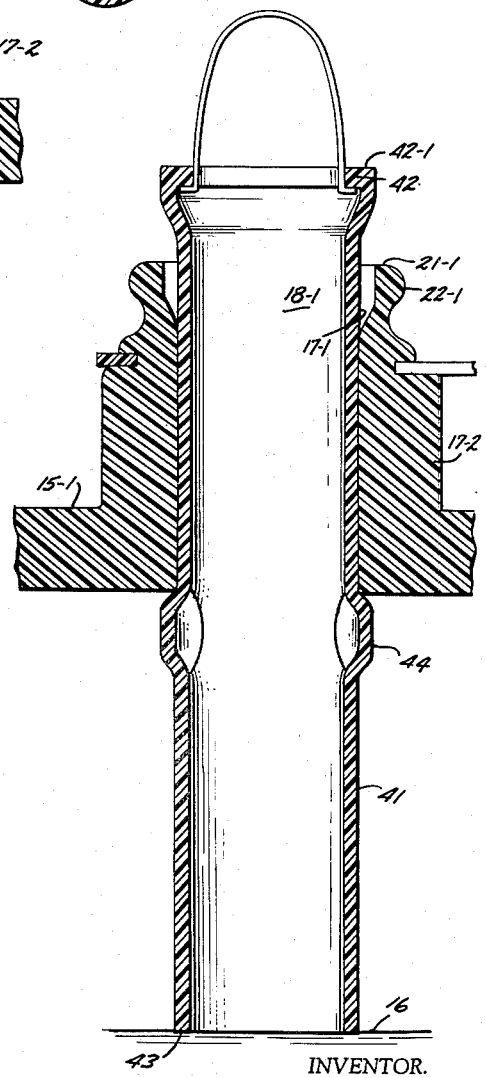
INVENTOR.
JOHN H. AUGUST
BY
Greene, Pineles & Durr
ATTORNEYS Feb. 7, 1961  J. H. AUGUST  2,971,045
GAS VENT CLOSURE FOR ELECTRIC STORAGE BATTERIES
Filed July 7, 1958  4 Sheets-Sheet 4
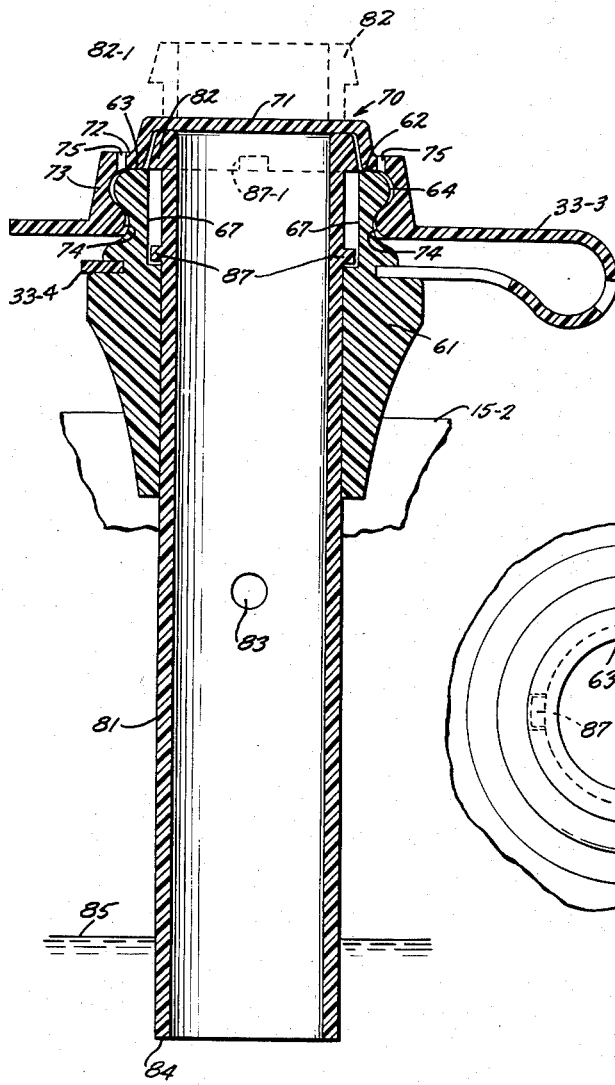
INVENTOR.
JOHN H. AUGUST
BY
*Greene, Pineless & Durr*
ATTORNEYS

United States Patent Office 2,971,045
Patented Feb. 7, 1961

2,971,045

GAS VENT CLOSURE FOR ELECTRIC STORAGE BATTERIES

John H. August, Elmsford, N.Y., assignor to Sonotone Corporation, Elmsford, N.Y., a corporation of New York Filed July 7, 1958, Ser. No. 747,029

4 Claims. (Cl. 136—178)

This invention relates to closures for storage battery casings wherein a plurality of electrodes and electrolyte are enclosed for supplying electric energy to an external load or for storing energy in at least some of the electrodes by charging current passed therethrough.

Among the objects of the invention is a simplified detachable closure for the casing opening of an electric storage battery, which closure maintains the casing opening sealed against entry or discharge of liquid and gas therethrough while permitting discharge of gas from the casing under excess pressure developed therein; and such detachable casing closure which holds in the casing opening a slidable filler tube which prevents entry of additional electrolyte liquid into the casing above a predetermined upper electrolyte level therein.

The foregoing and other objects of the invention will be best understood from the following description of exemplifications of the invention, reference being had to the accompanying drawings, wherein:

Fig. 3 is a cross-sectional view of a portion of the casing wall having the casing opening with the casing closure in closed position thereon;

Fig. 4 is a view similar to Fig. 3, showing how the casing closure permits escape and venting of gases through the casing opening by excess gas development while the closure remains interlocked with the casing opening;

Fig. 5 is a top view of the casing closure member of Figs. 1-4, when removed from the battery casing;

Fig. 6 is a bottom view of the casing closure member of Fig. 5;

Fig. 7 is a view similar to Fig. 3, showing how a casing closure of Figs. 1-6 holds within the battery casing opening an electrolyte filling tube which enables easy controlled admission of electrolyte to the casing interior so that it never exceeds a predetermined upper electrolyte level;

Fig. 8 is a view similar to Fig. 7, showing the casing cover open and the filler tube in its raised electrolyte-filling position;

Fig. 9 is a view similar to Fig. 7, of a modified slidable filler tube held within the casing opening, with a casing-opening closure which provides for automatic venting of excess gases through the casing opening, in accordance with the invention; and Fig. 10 is a top view of the casing opening neck of Fig. 9, with the filler tube held therein, but with the cover closure removed therefrom.

The casings of electric storage batteries have as a rule to be provided with a refilling opening for refilling the casing with electrolyte and also for discharging gases developed when charging the battery. A great many different types of vent covers have been devised for keeping the relatively large refilling opening closed while permitting gases under pressure to escape through relatively small vent channels provided in such vent covers. In alkaline batteries, the problem of providing a proper cover for the casing opening is aggravated by the fact that the corrosive alkaline electrolyte tends to leak by creepage through capillary passages, such as formed by the vent passages of known opening covers. In addition, some alkaline batteries must be able to operate with the casing opening facing downwardly and require seals for the vent passages of the opening cover. On the other hand, it is essential to assure ready escape of the large volume of gases evolved when fully recharging such battery within a short time, as is frequently required. Heretofore, relatively costly and cumbersome cover structures have been used to meet these problems. The present invention is based on the concept that the general structure of long-used elastic bottle covers—such as shown in U.S. Patent 639,832 of Shearman, issued in 1899—may be utilized as the covers for relatively wide casing openings of alkaline batteries for keeping the openings tightly sealed and prevent electrolye leakage in all operating positions of the batteries, while embodying in the perpihery of such elastic cover, vent channels which are normally disconnected from the casing opening, but are automatically connected to the casing opening to permit escape of gases under excessive internal gas pressure.

Figure 1:
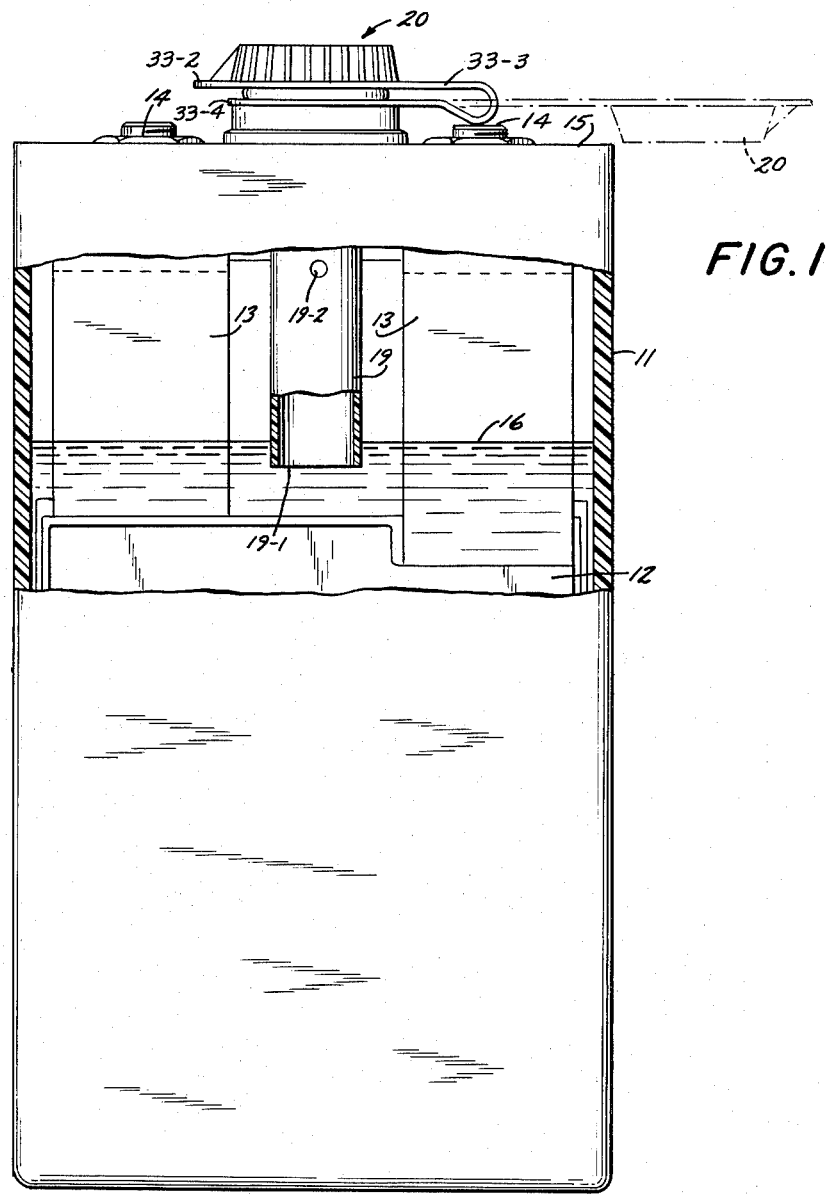
Fig. 1 is an elevational view with parts in section, of one form of storage battery having a casing opening provided with a detachable casing closure exemplifying one form of the invention.
Figure 2:
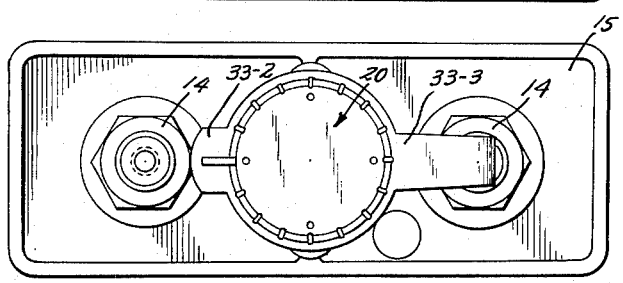
Fig. 2 is a top view of the storage battery with its casing closure.

Figures 1 and 2 show a typical alkaline storage battery equipped with a casing opening closure exemplifying the invention. The particular battery shown is of the alkaline nickel-cadmium type, and may be, for instance, of the type described in Koren et al. Patent 2,708,212, the contents of which are hereby made part hereof. It comprises a battery casing 11 within the interior of which is held an electrode assembly 12 consisting of a plurality of electrode plates of opposite polarity which are separated from each other by electrolyte-pervious thin, porous separator sheets or films which are filled with an alkaline electrolyte. The electrodes may consist of porous sintered nickel-particle plates which are impregnated with the respective active electrode materials for the positive and negative plates. The porous separators may be of the type described and claimed in Koren et al. Patent 2,696,- 515, or in the pending Smith-Johannsen application Serial No. 526,784, now Patent No. 2,940,871, filed August 5, 1955. The separators may also be made of other separator materials, for instance of a porous sheet of alpha cellulose filter paper sheet. Each set of opposite-polarity electrode plates of the assembly 12 is connected by two opposite-polarity electrode strap leads 13 to two opposite-polarity electrode terminals 14 which are held fixed and sealingly mounted within the top casing wall 15 of the battery casing 11.

Large-capacity batteries of this type have to be provided with an excess of electrolyte beyond that filling the electrode separator spaces. In the battery shown, the electrolyte level is indicated by level-line 16. Since some of the electrolyte is lost when charging the battery at a high charging rate, the electrolyte has to be replenished from time to time by passing additional liquid such as distilled water into the interior space of the casing 11.

Such nickel-cadmium batteries are of particular value because after having been fully discharged, they may be fully recharged within a short time at high charging rate by a large current through the electrodes and their electrolyte. When charging with such high charging rate, a large volume of gases is evolved within the interior of the battery casing, and unless some of the evolved gas is permitted to escape to the exterior space, the battery casing may burst as a result of excessive interior gas pressure.

The top casing wall 15 is provided with an opening wall or tubular neck 17 (Figs. 3, 4) surrounding a casing opening 18 through which liquid and gas may pass between the interior casing space and the exterior thereof. The casing opening 18 is provided with a baffle and filler tube 19 extending downwardly into the interior of the casing space with its lower open end 19—1 shown below the electrolyte level 16. The upper portion of filler tube 19 is provided with a vent-opening 19—2 near the upper level of the interior casing space for permitting gases to pass through the vent opening 19—2 and be discharged through the casing opening 18. The tube 19 assists in suppressing explosive ejection of electrolyte with the gases discharged from the casing interior through the casing opening 18 when, under rapid battery charging, a large volume of gases is developed in the limited interior volume of the casing space.

In accordance with the invention, the tubular neck wall of the battery-casing opening has a laterally outward neck flange at its outer end, and an integral cover of elastically stretchable resin substance is held in gas-tight sealing engagement with the radially inward end face region of the opening neck wall by the laterally-inward flange of the integral rim of the cover which surrounds and is held elastically stretched by the underface of the neck flange. The cover region which surrounds the radially inward cover sealing region that provides the gas-tight seal with the sealing zone of the neck end face, has a plurality of vent channels through which gas will escape when interior gas pressure lifts the cover sealing region from the underlying sealing zone of the neck wall.

One form of a battery-casing-opening closure or cover 30 of the invention will now be described. The cover 30 has a central cover portion 31 with a continuous peripheral cover region 32 overlying and held in gas-tight sealing contact engagement against the continuous radially-inward sealing zone of the end face 21 of the casing opening or neck wall 17. The cover 30 also has a downwardly extending rim wall or rim 33 surrounding and firmly attached to the outer side face of opening neck wall 17, by overlapping engagement of interlocking portions thereof. The interlocking portions along the outer side surface of the opening neck 17 are provided by an outward enlargement or neck flange 22 at the outer end of the neck 17 and by an adjoining radially-inward lower neck recess 23, which have continuously curved merging exterior surfaces. The interlocking portions along the inward face of the cover rim 33 are provided by a rim flange 34 at its lower edge and an adjoining higher rim recess 35 which have continuously curved merging interior surfaces shaped to fit and maintain interlocking engagement with the neck recess 23 and neck flange 22, respectively. The upper region of rim recess 35 merges along a continuously curved surface into cover sealing zone 32 held sealed against the sealing zone of neck end face 21.

The cover 30 may be made of a synthetic resin material such as nylon, polyethylene or the like, and at least the peripheral collar region 32 and its rim 33 are made of elastically stretchable synthetic resin material so that when the rim flange or bulge 34 is forced in downward direction, as seen in Fig. 3, over the neck flange or bulge 22, the rim bulge 34 will be stretched laterally outward as it slides over the curved surface of the widest central region of the neck bulge 22. After passing over the widest central region of neck bulge 22, the elastic restoring energy of the so-stretched cover rim 33 will cause its stretched rim bulge 34 to ride over the downwardly facing curved region of neck bulge 22 and contract around it for effecting a junction engagement which longitudinally stresses the rim thereby forcing and maintaining the cover sealing zone 32 into gas-and-liquid-tight sealing engagement against the underlying sealing zone of the neck end face 21 of casing opening 18. In other words, the cover rim 33 has such normal contracted position that when its lower rim bulge 34 is forced downwardly over the neck bulge 22 of casing opening 18, the cover rim bulge 34 will be elastically stretched by the widest region of neck bulge 22 as it is forced past it.

After passing the widest outer region of neck bulge 22, the elastic restoring energy of the so-stretched cover rim bulge 34 will cause it to contract and be moved in engagement along the downwardly facing region or under-face of neck bulge 22 into the upper region of neck recess 23, and thereby bring and maintain the cover sealing region 32 in tight sealing engagement against neck end face 21. After reaching this position, the elastic restoring energy stored in the stretched cover rim bulge 34 will continue to cause the rim bulge 34 to tend to contract and tend to move towards a deeper region of neck recess 23, thereby maintaining the sealing engagement between the cover sealing zone 32 and neck end face 21 at a desired high pressure level to assure that gas of normal pressure will not be able to escape through the casing opening 18 and that no corrosive electrolyte liquid shall leak through the casing opening 18 past the sealed zone of neck end face 31. The rim recess 35 is of such depth that when the rim bulge 34 reaches its innermost clamping position along the under-face of neck recess 23 interlockingly engaged thereby, a continuous region along the exterior surface of the neck bulge 22 will be separated by a narrow annular space and will remain free from engagement with surrounding regions of the cover rim 33 as its stretched rim flange 23 holds the cover sealing zone 32 sealed against the neck end face 21.

The outer peripheral region of the cover 30 extending radially outward beyond the cover sealing zone 32, is provided with one or more vent holes or channels 36 through which gas from the casing opening may escape when the cover sealing zone 32 has been lifted from neck end face 21. The cover sealing zone 32 is of elastically stretchable material so as to permit lifting thereof slightly away from sealing contact with neck end face 21 by pressure of gas within the casing opening 18 during a rapid battery charge within battery casing 11. Fig. 4 shows slightly exaggerated how gas pressure above a predetermined level developed within the battery casing acting on the stretchable cover wall 31, causes it to lift its cover sealing zone 32 slightly from the neck end face 21, thereby providing a narrow slit-like opening 38 through which gases may flow between the neck end face 21 and the overlying cover sealing zone 32 towards a series of outlet vent channels 36 and therethrough to the outside space. The slit 38 is of such narrow width that any liquid entrapped by the discharged gases will be deflected by the slit walls so that only gas of excess pressure will be permitted to escape through slit 38 and the vent holes 36 to exterior space. As soon as the gas pressure in the interior of the battery casing 11 drops below the pressure level which results in stretching and lifting of the cover wall 31 to provide the gas escape slit 38, the cover wall 31 will be returned to its normal sealing position shown in Fig. 3, in which its sealing zone 32 again maintains tight sealing engagement with neck end face 17. A simple cover closure 30 thus provides a tight gas and liquid seal for the battery casing opening 18, while permitting gas of excess pressure developed in casing 20 to escape therefrom without otherwise disturbing the sealing engagement between the cover 30 and battery casing 11 and the normal gas and liquid seal maintained at the casing opening 18.

In the form shown, the cover rim 33 is provided at its lower edge with a laterally protruding annular lip 33—1 provided at one end with a lip grip 33—2 which may be gripped by the fingers or by a tool for lifting and removing the battery cover 30 from its sealing position on the opening neck 17 of casing 11. In order that the cover 30 may remain readily available for closing the opening 17 after passing distilled water or electrolyte through opening 18 into the interior of the casing, the part of the cover rim lying opposite its lifting lip 33—1 is provided with a tail strap portion 33—3 having at its end a retainer loop 44 held on casing neck 17. The cover retainer loop 44 is shaped so that it may be elastically stretched and pushed down past the neck bulge 22 into an exterior neck retainer recess 27. Since the entire cover including its retainer loop 44 is made of elastic stretchable synthetic resin material, the retainer loop 44 may be dimensioned so that it may be stretched either for seating in the retainer slit 27 or for removing it therefrom.

Figs. 7 and 8 show how a casing closure of the invention of the type described in connection with Figs. 1–6, may be utilized for holding within the battery casing opening a slidable filler tube 41 which permits controlled addition of electrolyte liquid so as to limit the electrolyte within the battery casing 11 to a predetermined upper level. The battery casing, which is identical with that of Figs. 1–6, has a casing opening 18—1 in which is held a filler tube 41 which is slidably guided and positioned within guide wall surfaces 17—1 of opening neck wall 17—2 of casing top wall 15—1 of the battery casing. Within opening neck wall 17—2, the filler tube 41 may be slidably moved from its normal lower position in which it is shown in Fig. 7, to the raised filling position in which it is shown in Fig. 8.

The filler tube 41 has a relatively wider, thicker tube top portion 42 fitting and held fixed within a relatively wider mouth portion of opening neck wall 17—2. The tube top 42 has an upper end surface which is shown to be at the same level as the end surface 21—1 of the opening neck wall 17—2. The filler tube 41 is held fixed in its normal operative position within the battery casing, as shown in Fig. 7, by clamping sealing engagement of the overlying sealing region 32 of cover wall 30, which is held pressed in sealing engagement with the end surfaces 21—1 and 42—1 of the opening neck wall 17—2 and tube top 42, in the same way as corresponding elements of Figs. 1–6. Upon removing the casing cover 30 from its interlocking engagement with the locking enlargement 22 of opening neck 17—2, the filler tube 41 may be lifted from the position of Fig. 7 to the raised position of Fig. 8, where its lower level 43 determines approximately the maximum level of the electrolyte that may be admitted through filler tube 41 into the interior of the battery casing 11. When the filler tube 41 is in raised position, its vent opening 45 is tightly sealed by the sealing sliding engagement of the outer wall surfaces of filler tube 41 with the surrounding wall surfaces of opening neck wall 17—2. The upper filling position of filler tube 41 shown in Fig. 8, may be fixed by providing the filler tube 41 with two peripherally spaced outward stop shoulders or projections 44, for instance, which come into engagement with the edge of the cover wall when the filler tube is raised from the normal position of Fig. 7 to the raised filling position of Fig. 8.

The filler tube 41 may have thin, flexible walls made of synthetic resin material such as nylon, polyethylene or the like. The stop protrusions 44 may be formed at the diametrically opposite portions of filler tube 41 in a conventional way, by subjecting the wall portions of filler tube 41 to an outward deformation while heated to a flowing state, followed by cooling. The filler tube 41 with the two diametrically opposite stops 44 formed therein may be inserted into the opening 17—1 of the casing neck 17—2 by slightly folding an elastic flexible wall region of the tube 41 in inward direction so that its protrusion stops 44 will pass through neck opening 17—1. The mouth portion 42 of filler tube 41 may be provided with a lifting loop 51 formed of a flexible strap of synthetic resin material the ends of which are joined as by cement or heat-sealing to opposite wall surfaces of tube mouth portion 42. The lifting loop strap 51 may be folded into the interior of the filler tube 41 when it is in its normal lowered position, and may be lifted to its outward position shown in Fig. 8, for thereby lifting the filler tube 41 to the raised filling position. Otherwise, the casing closure with its gas vent release is identical with that of Figs. 1–6.

To fill the battery casing with electrolyte up to a maximum desired level indicated by dash-line 16 in Fig. 7, the casing cover 30 is lifted from its sealing seat shown in Fig. 7, and the filler tube is raised to the higher filling position shown in Fig. 8, where the tube stops 44 come into stopping engagement with the lower edge of the neck opening 17—1. In the position of Fig. 8, the lower level 43 of filler tube 41 determines approximately the highest level to which liquid may be admitted to the interior of the battery casing. In this raised position, the tube vent opening 45 is closed, and gas from the upper part of the casing space cannot escape. As a result, liquid passing through filter tube mouth 42 will flow into the interior of the battery casing only as long as the level of the electrolyte therein is below the lower edge 43 of filler tube 41. After flow of liquid into the casing stops when the electrolyte reaches the level of the lower tube edge 43, the filler tube 41 is moved to its lower position shown in Fig. 7, wherein vent opening 45 connects the upper battery casing space to the exterior space. Thereupon the small amount of the liquid contained in the filler tube 41 will flow into the surrounding casing space without materially raising the level of the electrolyte therein. With the filler tube in its lower position shown in Fig. 7, the casing cover 30 is forced over the locking enlargements 21 of the opening neck wall 17—2, thereby bringing the cover to its stretched sealing position shown, wherein its sealing periphery 32 is held forced in sealing engagement against the underlying end face 21—1 of opening neck wall 17—2 and the end face 42—1 of filler tube mouth 42.

Fig. 9 shows another type of an arrangement of the invention, of the type described in connection with Figs. 6 and 7. An electric storage battery with a battery casing similar to that of Figs. 1 and 2, has a casing top wall 15—2 provided with an opening neck wall 61 surrounding a casing opening 62 through which gas may be discharged from the interior of the casing or liquid added to the interior of the casing, as in the battery of Figs. 1 and 2. The casing opening 62 of the opening neck wall 61 is arranged to be closed by a detachable cover generally designated 70 having a central cover portion 71 with a peripheral cover zone 72 overlying and held in sealing contact engagement against the end face 63 of the opening neck wall 61 by a stretchable cover rim 73. The opening neck wall 61 has an outward side wall enlargement 64 which is surrounded and overlapped by the elastically stretched cover rim 73 which has at its lower edge an inward enlargement 74 which is elastically stretched to hold the sealing zone 72 of the cover 70 in tight gas and liquid sealing engagement with the end face 63 of opening neck wall 61, in the same way as the corresponding elements of Figs. 1–8.

The annular region of the cover rim 73 which surrounds the upper region of neck wall enlargement 64 is spaced therefrom by a narrow gap space. The cover sealing zone 72 of cover 70 is surrounded by an adjoining outer zone provided with a plurality, for instance four, vent openings 75, similar to the vent openings 36 of cover 30 of Figs. 1–7, for causing gases under pressure within the interior of the casing to be applied to central cover wall 71 and thereby lift the cover sealing zone 72 from its sealing engagement with neck end face 63 and cause the excess-pressure gases to be discharged through the vent openings 75 of the cover into the exterior space, until reduced internal gas pressure permits the central cover portion 71 and its annular sealing zone 72 to be released to its normal sealing position shown in Fig. 9, wherein it is maintained under gas and liquid sealing engagement with neck end face 63, in the same manner as the corresponding elements of Figs. 1–8.

Within the casing opening 62 of neck wall 61, is slidably positioned a filler tube 81 having at its upper end a grippable enlarged tube top 82 overlapping and projecting a distance above the surrounding neck end face 63 of casing opening 62. A substantial length of the filler tube 81 passing through opening neck wall 61 has a sliding fit with the wall surfaces of casing opening 62 so as to prevent escape of gases from the upper part of the casing space along the surfaces of the sliding engagement between the outer surface of filler tube 81 and the facing wall surface of casing neck wall 61. A portion of the filler tube 81 has a tube vent opening 83 opening into the upper casing space of the battery casing so as to permit gases accumulating therein to pass through the vent opening 83 into the interior of the filler tube 81 and be discharged through casing opening 62, if it is not closed, or if its cover 70 is stretched to permit escape of excess pressure gases, through its vent openings 75.

Fig. 9 shows the filler tube 81 with its lower tube end 84 below the approximate maximum level 85 of the electrolyte in the battery casing. The filler tube is arranged to be slidably moved within the interfitting surfaces of casing opening 62 of neck wall 61 from the lower position in which it is shown, to a raised position in which its top portion 82 is shown by dash-line 82—1. When the filler tube 81 is in its raised position, the filler tube vent 83 is sealed by its engagement with the surrounding surface of neck wall 61. When additional electrolyte liquid is poured into the opening of the filler tube, the electrolyte will flow into the interior of the casing only as long as the level of the electrolyte therein is below the lower filler tube edge 84. As soon as the electrolyte level in the interior of the battery casing reaches the tube bottom end 84 held in its raised position, corresponding to tube top end 82—1, the gas filling the upper space of the battery casing prevents entry of additional liquid and further flow of electrolyte into the interior of the battery casing is stopped.

The filler tube 81 is provided with simple means for retaining it in its raised position 81—1. To this end, a plurality of peripherally spaced portions, such as two diametrically opposite portions of filler tube 81, are provided with tube retainer projections 87 slidably movable within retainer guide slots 67 formed along the inwardly facing surfaces of neck wall 61 in the upper region of casing opening 62. The retainer guide slots 67 of neck wall 61 permit the filler tube 81 to be raised while in interfitting sliding engagement with the surrounding bottom region of neck wall 61 until the lower edges of the tube retainer projections 87 are raised to the level of the neck wall end face 63, whereupon turning the tube 81 around its axis causes the lower edge of the tube retainer projections 87 to rest and be retained on the underlying surface of neck end face 63 so as to retain the filler tube 81 in its raised dash-line position 82—1. In other words, the vertical axial distance between the lower edges of tube retainer projections 87 and the upper neck wall end face 63 corresponds to the height to which the filler tube 81 has to be raised to bring its lower tube edge 84 to the height of the uppermost electrolyte level within the interior of the battery casing. Thus, if the filler tube 81, after having been lifted to the raised position 82—1, has been turned 90° relatively to the lower position in which it is shown in Fig. 9, the tube stop projections 87 will rest on the underlying neck wall 61 in the positions of the dash-line tube stop projections 87—1.

The filler tube 81 may be provided with the retainer projections 87 in any suitable way, for instance, by cementing a sheet portion of the synthetic resin material which is compatible or the same as that of the filler tube 81 to the underlying wall surface of filler tube 81. Alternatively, the filler tube 81 may be provided on diametrically opposite or on three or four peripherally displaced surface portions with holes into which are forced or which are filled with interfitting small, solid synthetic resin plugs which are longer than the wall thickness of tube 81 and provide the desired retainer projections 87. The plug projections 87 may be suitably united to the surrounding wall of filler tube 81 as by heat-sealing or by cementing so that they form an integral part thereof.

The filler tube 81 is retained in its inward position within the casing by engagement of its upper tube end surface with the overlying peripheral zone of central cover wall 71. The central cover wall 71, although it may be stretchable, is not materially stretched or subjected to substantial force while it is held against the upper end surface of filler tube 81. However, the sealing zone 72 of the cover is held with the proper force pressure in sealing engagement with the opening neck wall end face 63 by the stretched biasing engagement of the cover rim bulge 74 with the downward bias zone of neck bulge 64.

To fill the battery casing with the filler arrangement of Fig. 9, the casing cover 70 is first lifted from casing opening 62 and its sealing seat engagement with casing opening neck wall 61. Thereupon the upwardly projecting grippable filler tube top 82 is gripped and raised with its retainers 87 along their retainer slots 67 in neck wall 61, until the tube retainer projections 87 are at the level of the neck end face 63. Thereupon the so-raised filler tube 81 is turned around its axis and retained in its raised position 82—1 with its retainer projections 87 seated on the underlying portions of neck end face 63. Electrolyte is then added through the open filler tube 81 while its vent opening 83 is held sealed by the surrounding casing neck wall 61 until the level of the electrolyte reaches the bottom edge 84 of the raised filler tube, and further flow of electrolyte into the interior of the casing space stops. Thereupon the filler tube 81 is turned until its retainer projections 87 reach their retainer guide slots 67 into which they drop, as the filler tube is lowered until its overlapping wider tube top 82 comes into engagement with the inner edge region of neck end face 63. Thereupon, the cover 70 is forced downwardly around opening neck wall 61 until rim bulge 74 passes over neck bulge 64, and is retained stretched by its downwardly facing angular bias zone for keeping the sealing zone 72 of cover 70 under the required sealing pressure and sealing engagement with the neck end face 63.

If excessive gas pressure develops in the interior of the casing, as during rapid charging of the battery, the excess pressure gases will act upon central cover region 71 and lift it together with its cover sealing zone 72 from its sealing engagement with neck wall end face 63 and provide between them a slit through which the excess pressure gases are free to flow out through cover vent openings 75 to the exterior space. As soon as the excess pressure gases are discharged, the lowered gas pressure in the interior of the casing permits the central cover wall 71 with its sealing zone 72 to return to its lowered position and the stretched rim 73 causes the cover sealing zone 72 to be returned and maintained under required sealing pressure in gas and liquid sealing engagement with the neck end face 63. Otherwise, the arrangement of Figs. 9 and 10 is similar to that of Figs. 1–8.

It will be apparent to those skilled in the art that the novel principles of the invention disclosed herein in connection with specific exemplifications thereof, will suggest various other modifications and applications of the same. It is accordingly desired that in construing the breadth of the appended claims they shall not be limited to the specific exemplifications of the invention described above.

I claim:

1. In an electric storage battery, a casing having a wall and an opening therethrough, a tubular neck extending outwardly of said opening, said neck having an open end and said end having a face of substantial width, a detachable cap of elastically yieldable material having a diaphragm-like cover wall with a rim depending therefrom, means for effecting a longitudinally stressed junction engagement between said rim and said neck, said cover wall being engaged with said face at the open end of said neck and establishing a gas-tight sealing zone therewith, by virtue of said afore-mentioned longitudinally stressed junction engagement, said cap having vent passage aperture means therethrough disposed beyond said sealing zone, and interiorly of said junction engagement, said open end of said neck being normally sealed from communication with said vent passage means by virtue of said sealing zone, said diaphragm-like cover wall being of sufficient elastic yieldability as to be flexed by increased gas pressure within said casing, whereby to open a passage through said sealing zone and permit egress of gas from said casing.

2. An electric storage battery as claimed in claim 1, wherein said vent passage aperture means comprises a plurality of peripherally spaced apertures in said cover.

3. In an electric storage battery as claimed in claim 1, wherein said rim is provided with an internal configuration of generally S-shaped cross section and said neck is provided with an external configuration of generally complementary shape, said rim being elastically deformable upon being forced down over said neck, wherein a major bulge of the cross-section of said rim tightly engages a complementary major recess of the external configuration of said neck for effecting said longitudinally stressed junction engagement.

4. In an electric storage battery as claimed in claim 1, a filler tube slidably held in the tubular neck of the casing wall opening, said filler tube having at its inward end an inward tube opening through which additional liquid may be passed into the interior casing space, said tube having a tube vent opening connecting the upper casing space to said casing opening for discharging gas therethrough, said tube having at its upper end a laterally wider seating region held by said cap in overlapping positioning engagement with surrounding wall portions of the casing for thereby fixing the normal inward position of said tube in said casing, said tube being slidable within said neck from a raised filling position wherein said inward tube opening determines approximately the highest level of electrolyte liquid in said casing, to said normal inward position wherein said inward tube opening is below the highest electrolyte liquid level in said casing, said vent opening being sealed by fixed surrounding wall portions of said casing when said filler tube is in its said raised position.

References Cited in the file of this patent

UNITED STATES PATENTS

| | | |
|---|---|---|
| 1,650,319 | Briggs | Nov. 22, 1927 |
| 2,235,101 | Enkur | Mar. 18, 1941 |
| 2,506,952 | Doughty | May 9, 1950 |
| 2,716,147 | Laughlin | Aug. 23, 1955 |
| 2,786,090 | Wells | Mar. 19, 1957 |

FOREIGN PATENTS

| | | |
|---|---|---|
| 336,473 | France | Jan. 16, 1904 |